United States Patent [19]

Nelson

[11] 4,057,109
[45] Nov. 8, 1977

[54] TRACTOR WITH HYDRAULIC DRAFT CONTROL

[75] Inventor: Roger John Nelson, Cedar Falls, Iowa

[73] Assignee: Deere & Company, Moline, Ill.

[21] Appl. No.: 601,659

[22] Filed: Aug. 4, 1975

[51] Int. Cl.² ........................................... A01B 63/112
[52] U.S. Cl. ................................... 172/7; 91/189 A; 91/402; 91/410; 172/9
[58] Field of Search ............................ 172/7, 8, 9, 10; 91/189, 402, 410; 214/766; 280/446 R, 446 A

[56] References Cited

U.S. PATENT DOCUMENTS

| | | | |
|---|---|---|---|
| 2,750,862 | 6/1956 | Garmager | 172/7 |
| 2,940,530 | 6/1960 | DuShane | 172/7 |
| 3,246,700 | 4/1966 | Smelcer | 172/7 |
| 3,470,963 | 10/1969 | Schneider et al. | 172/7 |
| 3,731,744 | 5/1973 | Lipinski | 172/7 |
| 3,834,738 | 9/1974 | Koch | 172/7 X |
| 3,894,476 | 7/1975 | Cobb | 91/410 X |

*Primary Examiner*—Richard T. Stouffer

[57] ABSTRACT

The lower draft link of a tractor three-point hitch includes a sensor to sense draft loads imposed on the draft link by an earth-working implement. Variations in the draft load cause variations in the pressure of the fluid in the sensor from a preselected pressure. A pilot-operated, load control valve is connected to the sensor and is shiftable in response to pressure above and below the preselected pressure to actuate a control mechanism. The control mechanism actuates a direction control valve for directing fluid to and from a hydraulic lift cylinder for respectively raising and lowering the draft link to adjust the implement so as to maintain the preselected pressure and thus maintain the desired draft load.

12 Claims, 2 Drawing Figures

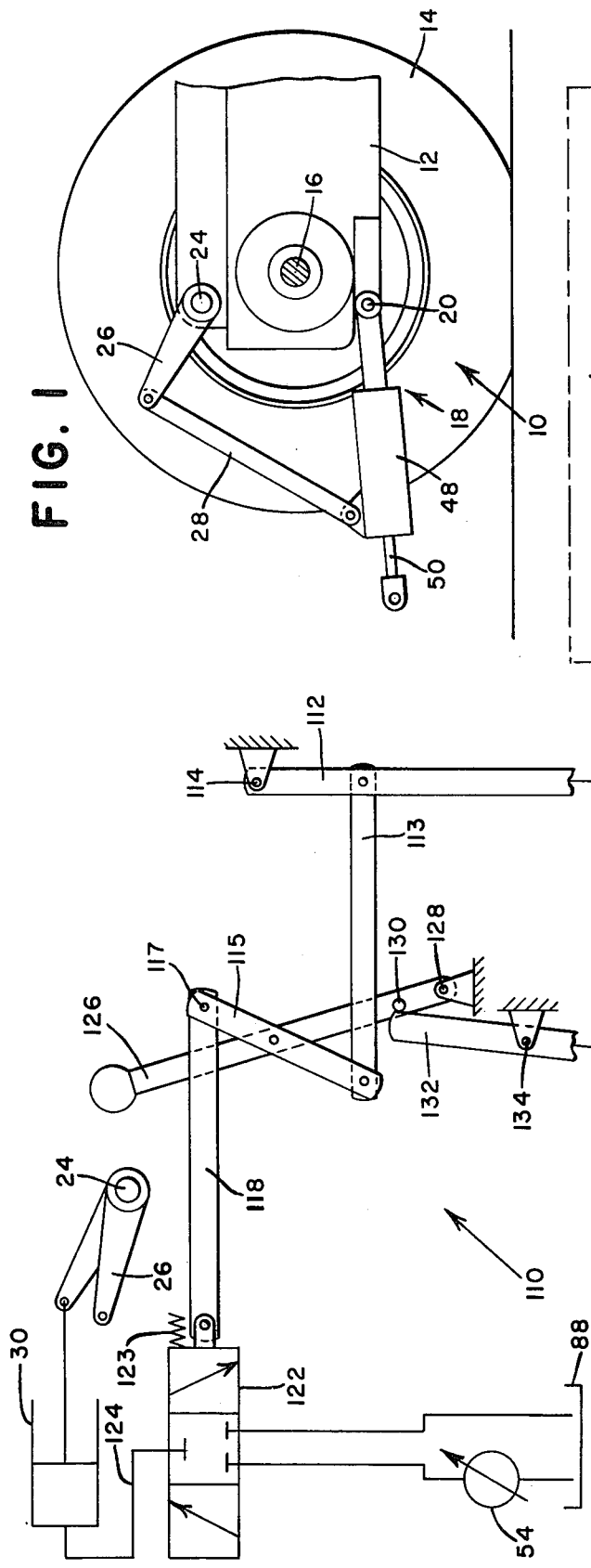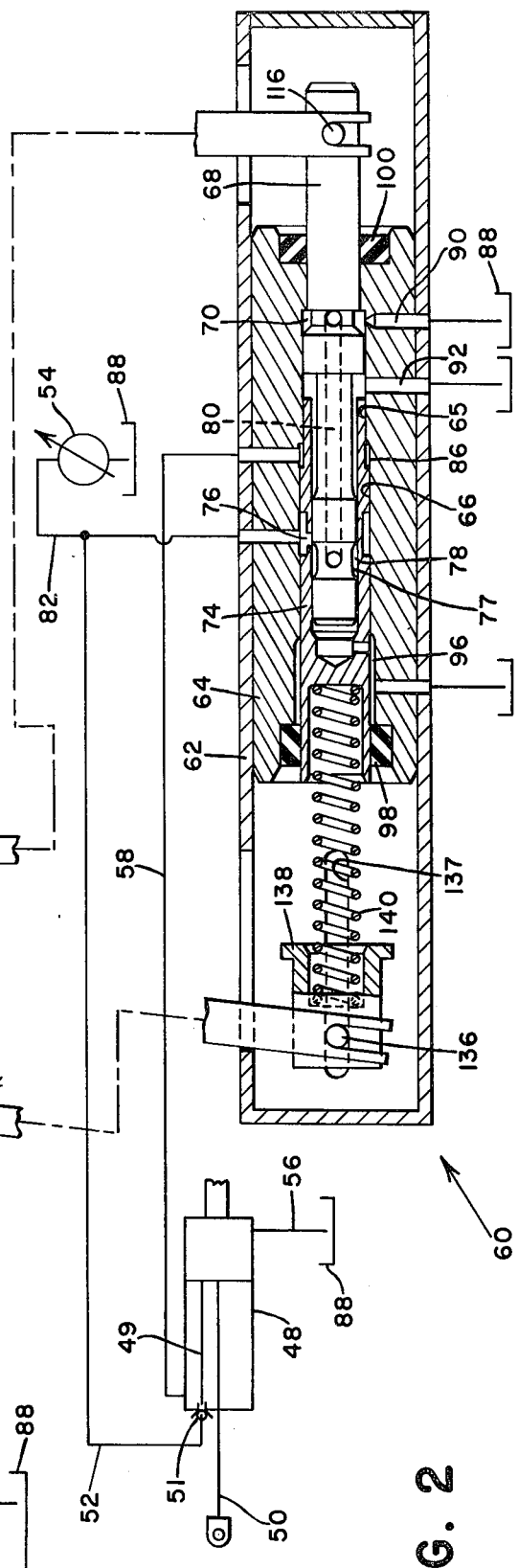

TRACTOR WITH HYDRAULIC DRAFT CONTROL

BACKGROUND OF THE INVENTION

The present invention relates generally to a hitch system of the type which is responsive to draft loads to adjust the working depth of an implement connected thereto to maintain a preselected draft force and more particularly relates to draft control using a pilot-operated hydraulic valve which increases the sensitivity of the direction control mechanism to deviations in the draft load.

Prior art hitch systems have generally provided for draft sensing connected directly to the control mechanism as disclosed in the U.S. Pat. No. 3,731,745 granted to J. A. Koch on May 8, 1973 and the U.S. Pat. No. 2,940,530 granted to W. H. DuShane on June 14, 1960.

SUMMARY OF THE INVENTION

It is a general object of the present invention to provide hydraulic draft load control incorporating a pilot-operated valve for maintaining a desired draft load. The valve is highly sensitive to deviations in the draft load and corrects the position of the draft links accordingly. When the draft load increases, a draft sensor signals the pilot-operated valve which amplifies the signal to cause the draft links to be raised. Likewise, when the draft load decreases, the sensor signals the pilot-operated valve which amplifies the signal to cause the draft links to be lowered.

The above and additional objects and advantages of the present invention will become apparent to those skilled in the art from a consideration of the following detailed description when taken in conjunction with the accompanying drawings.

BRIEF DESCRIPTION OF THE DRAWINGS

FIG. 1 is a section view of the rear portion of a tractor embodying a draft sensing hitch system used with the present invention; and FIG. 2 is a schematic of the draft load control of the present invention.

BRIEF DESCRIPTION OF THE PREFERRED EMBODIMENT

Referring now to FIG. 1, there is shown the rear portion of a tractor 10 including a chassis 12 and wheels 14 (only one shown) on an axle 16. Attached to the chassis 12 for vertical movement about a pivotal connection 20 and extending rearwardly therefrom is a rearwardly extending draft link 18. The draft link 18 has integral therewith a sensor cylinder or sensor 48.

A horizontal transverse rockshaft 24 is journaled for rotation in the chassis 12 and a crank arm 26 is secured to and extends rearwardly from the rockshaft 24. Innerconnecting the crank arm 26 and draft link 18 is a lift link 28. An extensible and retractable hydraulic lift cylinder 30 (shown in FIG. 2) is located in the chassis 12 and is connected to the rockshaft 24 for rocking the latter to cause the draft link 18 to be moved between a variable lowered working position and a raised transport position.

The sensor 48 includes a rod and piston assembly 50. The piston has a shaft 49 secured to it for selectively activating a ball check valve 51 which is connected by a supply line 52 to a fluid pump 54. The shaft 49 and the valve 51 cooperate to compensate for fluid leakage around the piston which is drained through a loss line 56 to a reservoir 88. The rod end chamber of the sensor 48 is connected by a sensor line 58 to a pilot-operated load control valve 60.

The pilot-operated valve 60 includes a valve housing 62 surrounding a valve body 64 having a longitudinally extending bore 65 with a main piston 68 positioned therein. The main piston 68 is slidably mounted in the bore 65 and in cooperation with the valve body 64 defines a main chamber 70.

A pilot piston 74 is slidably mounted in another longitudinally extending bore 66 and sleeved over a portion of the main piston 68 for relative sliding therebetween. The main piston 68 contains a groove 77 cooperating with the pilot piston 74 to form a sub-chamber 78 which is connected by a fluid passage 80 with the main chamber 70. The sub-chamber 78 is selectively connected by port means 76 and a supply line 82 with the fluid pump 54. The pilot piston 74 further cooperates with the valve body 64 to form a sensor connected chamber 86 which is connected by the sensor line 58 to the sensor 48.

In order to afford bi-directional movement of the main piston 68 as will be hereinafter described, the main chamber 70 is vented to the reservoir 88 by a restricted vent 90. First and second passages 92 and 96 are provided to prevent hydraulic lock between the main and pilot pistons 68 and 74.

To prevent leakage where the pilot piston 74 exits from the valve body 64, a pilot piston seal 98 is provided. Likewise, to prevent leakage where the main piston 68 exits from the valve body 64, a main piston seal 100 is provided.

A control mechanism, as is commonly known in the art and of the type shown in the U.S. Pat. No. 2,940,530 granted to W. H. DuShane, is illustrated at 110. The mechanism 110 includes a load control arm 112 pivoted at a load control arm pivot 114 and connected to the main piston 68 by a pin 116. The load control arm 112 moves a link 113. The link 113 in turn is connected to an intermediate link 115. The intermediate link 115 is connected to a valve link 118 which is connected to operate a three-position, three-way, direction control valve 122.

The direction control valve 122 has a first port in the first side thereof to which the fluid pump 54 is connected and a second port in the first side thereof to which the reservoir 88 is connected. The port in the second side of the direction control valve 122 is connected by a lift cylinder line 124 with the lift cylinder 30 for adjusting the position of the draft link 18. A positioning spring 123 biases the direction control valve 122 towards the connection of the lift cylinder line 124 with the reservoir 88.

A draft control lever 126 for manipulation by an operator to obtain a desired draft load is pivoted at a control lever pivot 128 and pivotally supports the intermediate link 115 which is pivotally connected to the valve link 118 through a pin 117. The draft control lever 126 is further operatively associated with a loading lever 132 which is pivoted at loading lever pivot 134 and abuts a pin 130 on the draft control lever 126 at one extremity and a bushing pin 136 sliding in a slot 137 in the valve housing 62 at the other. The bushing pin 136 is inserted in a guide bushing 138 which guides and selectively compresses a valve spring 140. The valve spring 140 biases the pilot piston 74 towards the main piston 68 and operates as will hereinafter be described.

With an earth-working implement (not shown) connected to the draft link 18 and being pulled through the soil by the tractor 10, the operator moves the draft control lever 126 to a position representative of the new desired draft load. This positioning places the control machanism 110 and the load control valve 60 in positions unique to the new desired draft load. Further, a preselected preload is imposed on the valve spring 140.

Since the earth-working implement is connected to the draft link 18, it imposes a draft load on the sensor 48. The draft load acting on the rod and piston assembly 50 provides a fluid pressure in the sensor connected chamber 86 which positions the pilot piston 74 such that the port means 76 is in restricted fluid communication with the subchamber 78. The restricted fluid communication allows merely enough fluid from the pump 54 to reach the main chamber 70 as required to make up the loss of fluid through the vent 90.

When the actual draft load increases in excess of the desired draft load, referring now to FIG. 2, the pressure in the sensor connected chamber 86 increases and forces the pilot piston 74 in the load control valve 60 to compress the preloaded valve spring 140 until the subchamber 78 is in full fluid communication with the port means 76. Pressurized fluid from the fluid pump 54 passes through the fluid passage 80 into the main chamber 70 to urge the main piston 68 to the left.

Movement of the main piston 68 acting through the draft control mechanism 110 linkages positions the direction control valve 122 to connect the fluid pump 54 with the lift cylinder 30 to cause the rockshaft 24 to rotate clockwise and decrease the implement draft until the desired draft load is sensed by the sensor 48.

With the reduction in pressure in the sensor connected chamber 86, the valve spring 140 slides the pilot piston out of full fluid communication with the port means 76. As the fluid in the main chamber 70 is lost through the vent 90, the main piston 68 is urged to the right by the positioning spring 123 on the direction control valve 122 acting through the draft control mechanism 110 linkages.

At the desired draft load, the restricted fluid communication between the subchamber 78 and the port means 76 is reestablished allowing the direction control valve 122 to assume the ports blocked position.

When the draft load decreases below the desired draft load, the draft load control operates substantially in the reverse manner as described for draft load increases. The pressure in the sensor 48 decreases and causes the restricted fluid communication to cease. As the fluid is lost through vent 90, the main piston 68 moves to reestablish restricted fluid communication and positions the direction control valve 122 to connect the lift cylinder 30 to drain into the reservoir 88. The rockshaft 24 rotates counter clockwise and the implement is lowered to increase draft until the desired draft load is reached. At the desired draft load, the pressure from the sensor 48 permits the restricted fluid communication to be reestablished and the direction control valve 122 to be returned to the ports blocked position.

To decrease the desired draft load, the draft control lever 126 is moved clockwise to a new position which in turn positions the direction control valve 122 to fluidly connect the fluid pump 54 to the lift cylinder 30. As the draft decreases, decreased pressure in the sensor 48 causes the restricted fluid communication in the load control valve 60 to cease. Movement of the main piston 68 to the right to reestablish fluid communication allows the control mechanism 110 linkages to move under urging by the positioning spring 123 to a new unique configuration so as to reposition the direction control valve 122 into its ports blocked position.

To increase the draft load, the draft control lever 126 is moved counterclockwise to a new position which in turn positions the direction control valve 122 to fluidly connect the lift cylinder 30 to the reservoir 88. As the draft increases, increased pressure in the sensor 48 causes full fluid communication in the load control valve 60. Movement of the main piston 68 to the left to reestablish restricted fluid communication forces the control mechanism 110 linkages to move into a further unique configuration so as to reposition the direction control valve into its ports blocked position.

As the draft control lever 126 is moved counterclockwise to call for an increase in the draft load, the loading lever 132 will pivot about the loading lever pivot 134 so as to urge the guide bushing 138 to cause increased compression of the valve spring 140. The valve spring 140 is a constant rate spring, thus equal fluctuations in draft load at different draft loads cause equal changes in the lift cylinder 30 position and the load control valve 60 is equally sensitive for small or large draft loads. Further, the ability to change the preload of the valve spring 140 to counterbalance the fluid pressure in the sensor responsive chamber 86 reduces the necessary movement of the pilot piston 74 and thus allows for a shorter pilot piston 74 than would otherwise be required.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations that fall within the spirit and scope of the appended claims.

I claim:

1. In a tractor having power adjusting means for effecting adjustment of an associated implement to increase or decrease draft load, a draft load control comprising: a sourse of pressurized fluid; draft sensor means responsive to draft load and providing a fluid output proportional thereto; load control valve means having an output receiving and main chambers provided therein; pilot piston means positioned in the output receiving chamber and movable therein in response to the fluid output; means fluidly connecting the source to the main chamber responsive to the movement of the pilot piston means to afford or block pressurization of the main chamber by the source; main piston means positioned within the main chamber and movable therein with respect to the pilot piston means in response to the affording or blocking of pressurization, one of said piston means encircled at least at one end thereof by the other of said piston means and control means operatively associated with the main piston means and responsive to the movement of the main piston means to selectively actuate the power adjusting means to effect adjustment of the associated implement.

2. The draft control as claimed in claim 1 wherein said control means includes biasing means operatively associated with the main piston means for opposing the affect of the pressurization on the main piston means and said load control valve means includes vent means fluidly connecting the main chamber to a fluid reservoir to afford relief of fluid pressure in the main chamber.

3. The draft control as claimed in claim 2 including further biasing means operatively associated with the pilot piston means for opposing the affect of the output on the pilot piston means.

4. The draft control as claimed in claim 3 wherein said control means includes varying means operatively associated with the further biasing means for increasing or decreasing the further biasing means opposition to the affect of the output.

5. In a tractor having power adjusting means for effecting adjustment of an associated implement to increase or decrease draft load, a draft load control comprising: a source of pressurized fluid; draft sensor means responsive to the draft load and providing a fluid pressure output proportional thereto; a valve body having first and second longitudinal bores provided therein; fluid passage means connecting the sensor means to the first bore; pilot piston means positioned within the first bore responsive to the sensor means output to slide in the first bore; said pilot piston means having an axial hole open to the second bore provided therein and further having port means provided therein connecting the source to the axial hole; main piston means slidably positioned in the axial hole and second bore, having subchamber means in fluid communication with the second bore and operatively associated with the port means to afford or block passage of pressurized fluid from the port means to the subchamber means in response to relative sliding movement between the pilot piston means and the main piston means, and responsive to fluid pressure in the second bore to slide in the second bore; and control means operatively associated with the main piston means and responsive to the sliding thereof to selectively activate the power adjusting means to effect adjustment of the associated implement.

6. The draft control as claimed in claim 1 wherein said control means includes biasing means operatively associated with the main piston means for opposing the affect of the pressurized fluid on the main piston means and said valve body includes vent means fluidly connecting the second bore to a fluid reservoir to afford relief of fluid pressure in the second bore.

7. The draft control as claimed in claim 6 including further biasing means operatively associated with the pilot piston means for opposing the affect of the output on the pilot piston means.

8. The draft control as claimed in claim 7 wherein said control means includes varying means operatively associated with the further biasing means for increasing or decreasing the further biasing means opposition to the affect of the output.

9. In a tractor having power adjusting means for affecting the vertical raising or lowering of an associated implement to decrease or increase draft load, a draft control comprising: a source of pressurized fluid; draft sensor means responsive to draft load and providing a fluid pressure output proportional to the draft load; a valve body having first, second and third coaxial bores provided therein; means fluidly connecting the sensor means to the first of the bores; source passage means fluidly connecting the source to the first of the bores; pilot piston means having the first and second concentric cylindrical portions respectively slidably positioned within the first and second of the bores and cooperating therewith to form a sensor chamber fluidly pressurized by the sensor means output to urge the pilot piston means to slide in the first and second of the bores; said pilot piston means having an axial hole open to the second bore provided therein and further having port means provided therein in the first concentric portion operatively associated with the source passage means for fluidly connecting the source to the axial hole; main piston means having a first and a second concentric cylindrical portions respectively slidably positioned within the second and third of the bores and cooperating therewith to form a main chamber; said main piston means having a third concentric cylindrical portion adjacent the first portion slidably positioned in the axial hole; said third portion having subchamber means provided therein in fluid communication with the main chamber operatively associated with the port means to fluidly connect and disconnect the source from the main chamber in response to relative movement between the pilot and main pistons so as to afford and block pressurization of the main chamber whereby the main piston means is urged to slide in the first and second of the bores; and control means operatively associated with the main piston means and responsive to the sliding thereof to selectively activate the power adjusting means to effect adjustment of the associated implement.

10. The draft control as claimed in claim 9 wherein said control means includes biasing means operatively associated with the main piston means for opposing the affect of pressurized fluid on the main piston means and said valve body includes vent means fluidly connecting the main servo chamber to a fluid reservoir to afford relief of fluid pressure in the main servo chamber.

11. The draft control as claimed in claim 10 wherein said valve body includes a helical spring urging the pilot piston means to oppose the affect of the fluid pressure output on the pilot piston means.

12. The draft control as claimed in claim 11 wherein the control means includes manually operable means providing an input proportional to desired draft load and further includes varying means responsive to the manually operable means for increasing and decreasing the helical spring compression.

* * * * *